US008806639B2

(12) United States Patent
Mohler

(10) Patent No.: US 8,806,639 B2
(45) Date of Patent: Aug. 12, 2014

(54) CONTEXTUAL VIRTUAL MACHINES FOR APPLICATION QUARANTINE AND ASSESSMENT METHOD AND SYSTEM

(75) Inventor: David S. Mohler, Arvada, CO (US)

(73) Assignee: Avaya Inc., Basking Ridge, NJ (US)

( * ) Notice: Subject to any disclaimer, the term of this patent is extended or adjusted under 35 U.S.C. 154(b) by 79 days.

(21) Appl. No.: 13/249,502

(22) Filed: Sep. 30, 2011

(65) Prior Publication Data
US 2013/0086684 A1 Apr. 4, 2013

(51) Int. Cl.
G06F 11/00 (2006.01)
(52) U.S. Cl.
USPC .......... 726/24; 726/23; 726/25; 713/187; 713/188; 709/215
(58) Field of Classification Search
None
See application file for complete search history.

(56) References Cited

U.S. PATENT DOCUMENTS

2008/0295179 A1* 11/2008 Kedem .................. 726/26
2010/0005291 A1* 1/2010 Hulten et al. .......... 713/156
2010/0146507 A1* 6/2010 Kang et al. ............ 718/1
2012/0011509 A1* 1/2012 Husain .................. 718/1

* cited by examiner

Primary Examiner — Shewaye Gelagay
(74) Attorney, Agent, or Firm — Sheridan Ross P.C.

(57) ABSTRACT

Described are embodiments that provide for the use of multiple quarantine partitions and/or multi-partition spaces (e.g., virtual machines) for initially installing and running downloaded content. The downloaded content can be run securely in the quarantine partitions and/or multi-partition spaces. Each quarantine partition and/or multi-partition space can be configured differently with different capabilities. Based on the configuration and capabilities of the quarantine partitions and/or multi-partition spaces, the downloaded content may have limited capabilities to access secure data, applications, or other code limiting the damage that the content can potentially cause.

20 Claims, 5 Drawing Sheets

CONTEXTUAL VIRTUAL MACHINES FOR APPLICATION QUARANTINE AND ASSESSMENT METHOD AND SYSTEM

BACKGROUND

There are a large number of sources of applications for use in computing devices such as cell phones, PDA's, text devices, tablets, PC's, or the like. While the user may be able to look up anecdotal and/or rating information on the utility and/or safety of an application, this may or may not relate to the current version and/or enterprise or environment within which the user intends to use the application.

An unscrupulous vendor or author can place malware in a software application. A user typically has limited signs (if any) that there is a problem until the malware is active. Application software resident malware can divulge personal information, enterprise information, service disruption, current location and/or many other types of information that are accessed without the user's express permission.

One solution to the above-identified problem is to have one location where applications can be initially, safely installed. For example, a sandbox, or quarantine, area can be established in memory. The sandbox area can be configured with some security parameters that do not allow the application to access sensitive data. However, once security parameters have been established for the sandbox, any application that has a behavior that violates the security parameters will typically be labeled as "unsafe" even though there may be situations in which the application's behavior is acceptable. Thus, in some situations the benefits of a particular application are lost because only a single set of security parameters are established, which typically may be the strictest parameters.

Although specific problems and issues have been identified in this background section, the embodiments described herein are not limited to solving these particular problems or issues. The embodiments may be applied to solve problems not described in this background section.

SUMMARY

It is with respect to the above issues and other problems that the embodiments presented herein were contemplated. Embodiments described in the present disclosure provide for running, executing, or processing all or part of downloaded content (such as computer software (e.g., application) and other forms of executable code, files, digital photographs, and other forms of media, and other forms of computer content) within one of a plurality of quarantine partitions or a quarantine partition having a multi-partition space (such as multiple virtual machines) within a computing device. The quarantine partitions are generally for newly downloaded content. Typically, a multi-partition space has multiple partitions, each associated with a defined user context and/or rule set and/or set of preferences and/or set of boundary conditions required externally and/or by a user based on the user context. Boundary conditions (or situations where the behavior of the downloaded content opens marginal opportunities for malware) can be provided to the user for approval or rejection depending on a defined user context and the user perceived risk versus return of the downloaded content. Depending on the user's choices, he or she may allow full or partial operation of the downloaded content or downloaded content feature availability.

Each quarantine partition or multi-partition space, in one embodiment, would receive enterprise, environment, and/or other global security rules as the initial basis of malware detection. Standard malware scanning and detection systems could also be incorporated within each quarantine partition or multi-partition space. A user could also overlay supplemental criteria beyond any global or universal requirements. New quarantine partitions and/or multi-partition spaces can be created when a substantially new user context is needed. One quarantine partition or multi-partition space can satisfy the requirements for more than one user context when the user contexts have common security requirements. The quarantine partition or multi-partition space can compare the downloaded content and/or download against a rule base and report, to the user or administration, any condition(s) where a marginal threat can occur and/or a likelihood that the downloaded content and/or download includes malware. Such information can allow the user to more accurately make the risk versus return decision and selectively approve one or more portions or specific features of the code.

In one embodiment, the quarantine partition or multi-partition space is in the form of one or more virtual machines configured to have limited capabilities so that content downloaded from untrusted sources and run within the virtual machine have limited or restricted access to external memory locations, applications, and data. Each of the virtual machines can be configured with different capabilities, rule sets, and/or user configurable boundary conditions. The downloaded content running within a virtual machine is monitored for some period of time to determine if the downloaded content is safe to be permanently installed outside of the virtual machine.

In some embodiments, the virtual machine is associated with a user context of a user of the computing device (e.g., work, home, travel, personal, etc.), an enterprise of which the computing device is part, a virtual, logical, or physical external environment, and/or the user's preferences). The user may have more than one user context, each of which is associated with a different virtual machine. The user may configure each virtual machine with different capabilities that reflect the user context associated with the virtual machine. For example, a virtual machine may be associated with a work user context. In the work user context, the user may utilize a corporate email account and access applications and data on servers that are protected by firewalls with strict security parameters. A user may configure the virtual machine associated with the work user context to severely limit its capabilities, such as not allow downloaded content running within the virtual machine to access contacts, email accounts, or other applications. In contrast, a virtual machine associated with a user's personal user context may utilize a less sensitive email account and data. In this situation, a user may configure the virtual machine associated with the personal user context to have more capabilities, such as access to a calendar and personal contacts.

One embodiment provides a system with a memory, and a processor in communication with the memory, and operable to execute computer executable instructions to perform a method. The method includes installing a downloaded content in a first virtual machine of a plurality of virtual machines stored in the memory. The first virtual machine includes a first set of capabilities that are more limited than a second set of capabilities of a second virtual machine of the plurality of virtual machines. The downloaded content is executed in the first virtual machine and is monitored during its execution. The monitored information is stored in a storage medium. In embodiments, the monitored information includes information about downloaded content requests (e.g., to store data, retrieve data, send data, or launch an application), memory usage, processor usage, bandwidth usage. The monitored information also indicates whether any request would require capabilities beyond the capabilities of the virtual machine, such as requests to access secure applications or memory locations.

In one embodiment, the computing device determines a user context of a user, and consequently the virtual machine associated with the user context, into which a downloaded content will be installed. The user context may be determined in a number of different ways. For example, the device may prompt the user to identify the user context. In other embodiments, the user context may be determined automatically using time, location, and/or activity information of the user. For example, if the current time is a weekday during work hours, the determination may be made that the user is in the work user context. After the user context is determined, the downloaded content will be installed into the virtual machine associated with the determined user context, in the example above the work user context.

The monitored information also indicates, in some embodiments, whether any downloaded content request goes beyond the capabilities of the virtual machine, such as requests to access secure applications or memory locations unavailable to the virtual machine. In some embodiments, if downloaded content makes such a request the downloaded content may be indicated as a security risk and will be prevented from being installed permanently outside the virtual machine in the host operating system. In other embodiments, the user may be prompted for approval to permanently install the downloaded content outside the virtual machine. The user may be prompted after the monitoring period has ended to approve installation of the downloaded content outside the virtual machine. In this embodiment, a summary of the monitoring information may be provided to the user, including a summary of the requests that required access beyond the capabilities of the virtual machine. A user may then provide an indication of whether the downloaded content may be installed outside the virtual machine. In other embodiments, a user may be prompted for approval each time downloaded content requests access beyond the capabilities of the virtual machine. If the user approves the request, the downloaded content will be allowed the requested access.

Another example embodiment is directed to a method for executing a downloaded content on a mobile device; the method includes determining a first user context of a user of the mobile device. Downloaded content is then installed in a first virtual machine of a plurality of virtual machines stored in memory of the mobile device. The first virtual machine is associated with the first user context and each of the plurality of virtual machines is associated with a different (e.g., a second) user context of the user. After installation, the downloaded content is executed in the first virtual machine and monitored during its execution. Information regarding execution of the downloaded content is stored or logged on a storage medium. The downloaded content is monitored for some period of time, which may be selected by the user or automatically programmed into the mobile device. In one embodiment, the user may input the predetermined period of time prior to monitor the downloaded content.

The user context may be determined in a number of different ways. In one embodiment, a user inputs the user context. This may be effected by displaying a list of possible user contexts to a user and receiving a selection of one of the user contexts. In other embodiments, the mobile device may be configured to evaluate parameters such as a current time, a current location, and a current activity. These parameters are then used to automatically determine a current user's context.

The first virtual machine is configured to have a first set of capabilities. These capabilities reflect its associated user context. For example, if the user context is a work context, the first virtual machine will have limited capabilities compared to a personal context. The capabilities may include access to sensitive memory locations, access to data, and access to applications.

In other embodiments, a computer readable storage medium is provided that includes computer executable instructions stored onto a computer readable medium which, when executed by one or more processors of a computer, cause the computer to perform a method for downloading and executing a downloaded content. The method includes determining a first user context and installing a downloaded content in a first virtual machine associated with the first user context. The downloaded content is executed and monitored. The monitored information is stored in a storage medium. The method further includes determining a second user context and installing a second downloaded content in a second virtual machine associated with the second user context. The second downloaded content is executed in the second virtual machine and monitored for a period of time. Monitored information is stored in a computer storage medium.

The first virtual machine is more limited in its capabilities than the second virtual machine. As a result, the downloaded content installed in the first virtual machine is also limited compared to the downloaded content installed in the second virtual machine. For example, the first virtual machine may be configured so that it is not capable of accessing the user's schedule and consequently the first downloaded content executing in the virtual machine will not be able to access the user's schedule. In contrast, the second virtual machine may be capable of accessing this information and as a result, the second virtual machine will also be able to access the scheduling information.

In some embodiments, if a downloaded content in the first or second virtual machine makes a request that goes beyond the capabilities of the virtual machine, the user may be prompted to approve the request. If the user approves the request, the downloaded content will be allowed the requested access. In other embodiments, after the monitoring period is over, a summary of the monitoring information may be provided to the user, including a summary of the requests that required access beyond the capabilities of the virtual machine. A user may then provide an indication of whether the downloaded content may be installed outside the virtual machine.

The present disclosure can have advantages. For example, a user would have much greater control, compared to conventional malware detection algorithms, to control the detection and removal of potential malware. Multiple quarantine partitions or multi-partition spaces, each with a different, unique rule base, would be more adaptable and responsive to user needs and preferences. This can reflect context and enterprise and/or environmental-specific rules. The user can even review boundary conditions for approval or rejection. None of the conventional sandbox partitions have user-gated approval steps for behaviors that may have some limited malware risk but also introduce capabilities that are otherwise unavailable. The quarantine partition or multi-partition space of the present disclosure can enable the user to review safely the downloaded content for malware rather than a detection program that may have a false negative or positive. Due to the wide variety of downloaded content available, some downloaded content may act like malware but actually is consistent with the user's wishes. Each quarantine partition or multi-partition space can allow periodic malware detection program updates in accordance with the context of the user and the enterprise or environment.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "in communication with" as used herein refers to any coupling, connection, or interaction using electrical signals to exchange information or data, using any system, hardware, software, protocol, or format.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "malware" short for malicious code includes programming (code, scripts, active content, and other software) designed to disrupt or deny operation, gather information that leads to loss of privacy or exploitation, gain unauthorized access to system resources, and other abusive or malicious behavior. Malware includes computer viruses, worms, Trojan horses, spyware, dishonest adware, scareware, most rootkits, and other malicious and/or unwanted software or program.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The term "virtual machine" as used herein refers to an isolated operating system within a host operating system. The virtual machine may be implemented in any suitable fashion for example with software emulation or hardware virtualization. The virtual machine may provide a limited set of capabilities for any code running within the virtual machine. For example, the virtual machine may only allow code running within the virtual machine to access a predetermined set of functions, data, and/or elements of memory.

The term "monitored information" as used herein refers to any information about a downloaded content running within a virtual machine. Non-limiting examples of monitored information include application requests (e.g., to store data, retrieve data, send data, and/or launch an application) and performance information (e.g., memory usage, processor usage, and/or bandwidth usage).

The term "user context" as used herein refers to a grouping of objects, modules, routines, sub-routines, and/or applications that are used by a user under situations that have one or more common characteristics such as time, location, and/or activity.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
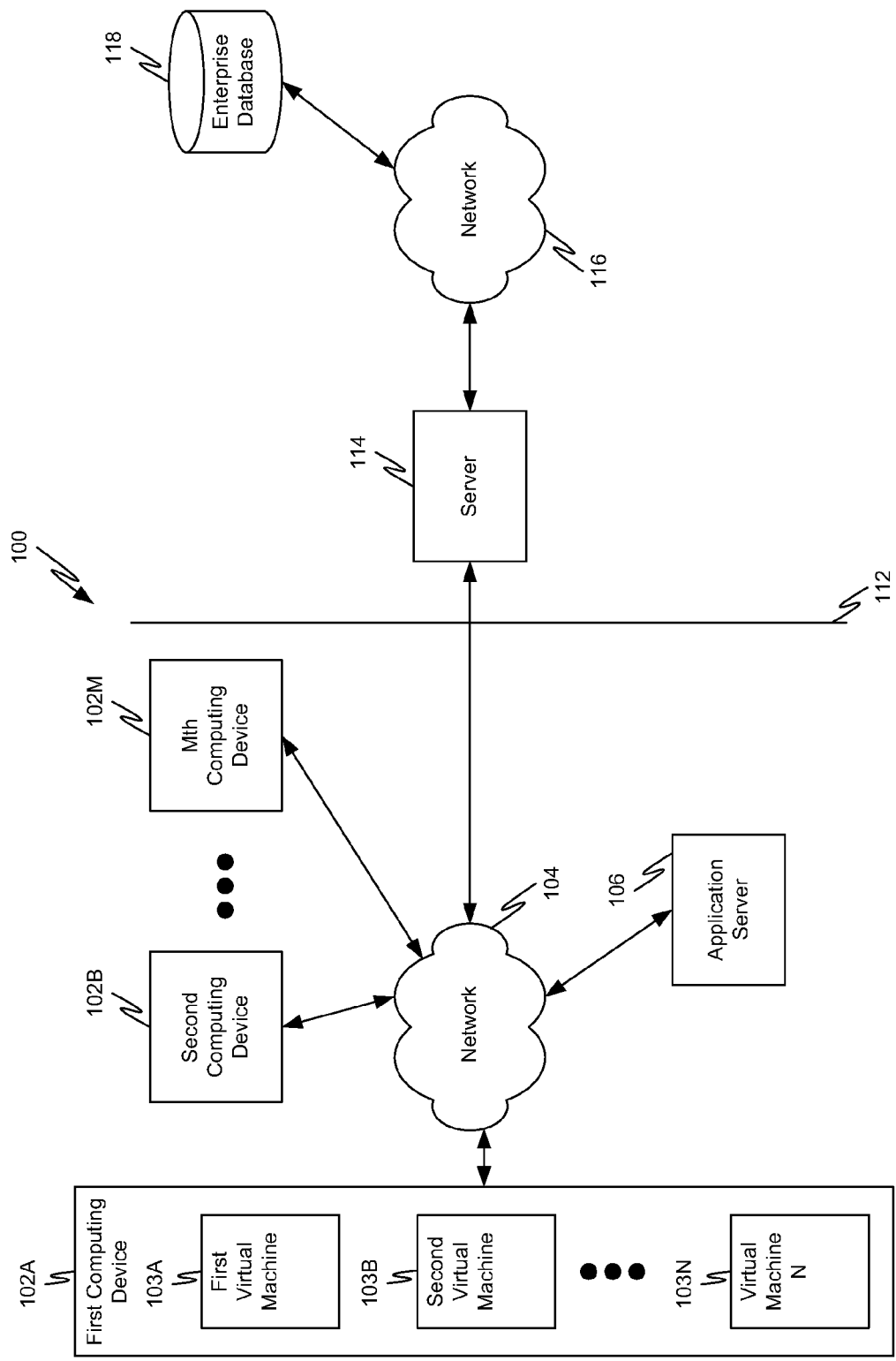
FIG. 1 is a block diagram of a system including a computing device according to an embodiment for executing a downloaded content in a virtual machine.

A system 100 that includes a computing device 102 for installing and executing a downloaded content in a virtual machine is shown in FIG. 1. Although the following description is made with reference to downloaded applications, it is to be understood that the description applies to other forms of downloaded content. It is further to be understood that, though the following description is made with reference to virtual machines, the principles of the present disclosure are applicable to other types of quarantine partitions or multi-partition spaces, such as sandboxes.

As illustrated in FIG. 1, system 100 includes first, second, . . . Mth computing devices 102A-M, which is connected to a network 104. Also connected to the network is application server 106, which provides applications for download by other devices connected to the network 104.

As shown in FIG. 1, each of the first, second, . . . Mth computing devices 102A-M includes first, second, . . . Nth virtual machines 103A-N. The first, second, . . . Nth virtual machines 103A-N are each configured with different capabilities. In embodiments, applications installed on first, second, . . . Mth computing devices 102A-M are first installed within one of the first, second, . . . Nth virtual machines 103A-N and monitored for a period of time before they are installed outside of the first, second, . . . Nth virtual machines 103A-N on the host operating system (not shown). The first, second, . . . Nth virtual machines 103A-N are limited in their capabilities for security reasons. That is, code executing within each of the first, second, . . . Nth virtual machines 103A-N will not be granted access to some data, memory locations, functions, and/or applications that may be considered sensitive.

In operation, a user of first, second, . . . Mth computing devices 102A-M may download an application from application server 106. The application server 106 may be an untrusted source in which case there may be some security risks if the application is installed in the host operating system of a first, second, . . . Mth computing device 102A-M. If the application contains malicious code, it may attempt to contact the other of the first, second, . . . Mth computing devices 102A-M whose contact information is stored on the computing device 102 to infect the first, second, . . . Mth computing devices 102A-M. Worse yet, the malicious code may attempt to connect to server 114, which is behind a firewall 112. The server 114 may be connected to a network 116, such as an enterprise network, belonging to the user's employer. Thus, the malicious code may attempt to access sensitive information in enterprise database 118.

To guard against possible malicious code, the application is, automatically or at user request, first installed in one of the first, second, . . . Nth virtual machines 103A-N before being installed in the host operating system of an first, second, . . . Mth computing device 102A-M. In the first, second, . . . Nth virtual machine 103A-N, the application, or one or more parts thereof, is executed and monitored for a period of time. Monitoring and detection of malware can be done, for example, using enterprise, environment, and/or other global security rules (which identify suspicious behavior from the application that resembles malware behavior) that depend upon user context. User context, which may be configured by the user when a virtual machine 103 is created, defines a personality or activity of the user, such as at work, at home, personal, business, traveling, and the like. As will be appreciated, user context determines the type, functionality, capability, system and data requirements, security requirements, purpose, and/or permissible functions, features, and actions of downloaded content. An application downloaded on a computing device having a work context should not, for instance, be accessing personal information on a home computer. Nor should an application downloaded on a personal computing device having a home or personal context be accessing work or employment information on a work computer. User context can be determined automatically by the identity of the particular computing device involved in downloading the application (where the user has multiple computing devices), the identity used by the user when downloading (where the user has multiple identities (e.g., electronic addresses such as instant messaging handles, email addresses, and the like), the account used by the user to purchase the downloaded application, the logical location of the computing device (e.g., whether inside or outside an employer's enterprise network), the physical location of the user (e.g., based on a satellite-based location system such as the Global Positioning System), and other factors mentioned below.

Other malware detection techniques that may be employed by the respective virtual machine 103 include emulating the beginning of the code of each new executable that is being executed before transferring code to the executable, emulating the operating system, running executables in the simulation (e.g., if one program attempts to write data to an executable program, for example, this is flagged as suspicious behavior), and/or other techniques, such as signature-based detection (or searching for known patterns of data within executable code such as by comparing an application, in whole or part, to a malware library of known malware), heuristics (such as generic signatures which identify new malware of existing known malware by looking for known malicious code), and other techniques known to one of ordinary skill in the art. Dictionary-based approaches compare code segments in the application against code segments of known malware. Monitored information is logged or stored to record the behavior of the application.

After a period of time, a user can use the stored modified information to decide whether to allow the application to be installed in the host operating system outside of the virtual machine, or, if it is deemed to pose a security risk, it can be removed or erased from the first, second, . . . Mth computing device 102A-M. This can be done by enabling a user to set boundary conditions. Boundary conditions describe situations where the behavior of the monitored application has more or less than a threshold likelihood or a user acceptable risk of an instance of malware. More than a threshold likelihood indicates that the monitored application likely contains at least one instance of malware. Less than a threshold likelihood indicates that the monitored application likely does not contain malware. The user acceptable risk is typically determined by a user's response to questions or prompts regarding the results of monitoring behavior of the application. A user configured boundary condition can allow full or partial operation of feature availability of the installed application.

One feature of embodiments is that each of the first, second, . . . Nth virtual machine 103A-N on the first, second, . . . Mth computing devices 102A-M may be configured with different capabilities. For example, the first virtual machine 103A may be configured to have more limited capabilities than the second virtual machine 103B. The capabilities of each of the first, second, . . . Nth virtual machine 103A-N may be determined by a user. As described in greater detail below, in some embodiments, the capabilities reflect a user context.

As one example, a user on a first, second, . . . Mth computing device 102A-M may decide to download an application from server 106. The application may have some scheduling features that require access to a user's scheduling information. First virtual machine 103A may be configured to have strict security configurations and not allow access to the user's scheduling information, while second virtual machine 103B may be configured with the capability to access a user's scheduling information. As a result, a user may decide to have the application installed in virtual machine 132B to allow access to the scheduling information. In conventional systems, e.g., that utilize a sandbox area, a user is not provided different options for limiting the access of an application. Rather, a sandbox typically is configured and provides the same limitations to all applications running within it.

In other embodiments, one or more of the first, second, . . . Nth virtual machine 103A-N on the first, second, . . . Mth computing devices 102A-M may be configured with the same capabilities. Using these embodiments, two or more applications can be provided the same capabilities by different virtual machines; however, since they are running in different virtual machines, they cannot share information. These embodiments may be used in situations where a user may want to limit a downloaded application's ability to communicate with other downloaded applications, yet they may want the downloaded applications to be limited to the same capabilities.

As an application is executing within one of first, second, . . . Nth virtual machines 103A-N. It may make requests that are beyond the capabilities of the virtual machine. In some embodiments, the first, second, . . . Mth computing device 102A-M is configured to prompt the user each time an application requests access that goes beyond the capabilities of the corresponding first, second, . . . Nth virtual machine 103A-N in which it is executing. In one embodiment, a message is displayed to a user with information describing the action that the application is attempting to take that is beyond the capabilities of the corresponding first, second, . . . Nth virtual machine 103A-N and requesting approval by the user. As one example, the message may state "XYZ application is attempting to access your email account. Do you approve this action?" The user can then approve or disapprove the action. This may cause the rule set governing the respective first, second, . . . Nth virtual machine 103A-N operation or behavior to be updated to reflect the user approval.

As indicated above, during the execution of an application within one of the first, second, . . . Nth virtual machines 103A-N the application is monitored and the monitored information is stored. The monitored information includes, in embodiments, information regarding actions taken by the application including requests to store data, retrieve data, send data, and/or launch an application. In some embodiments, the monitored information may also include other information such as memory usage, processor usage, and/or bandwidth usage.

As indicated above, the application is monitored for a predetermined period of time. In embodiments, the time is selected by the user. The user may input the period of time when configuring the respective first, second, . . . Nth virtual machine 103A-N so that every first, second, . . . Nth virtual machine 103A-N may have a different monitoring period of time. In other embodiments the period of time may be selected when installing an application into one of the respective first, second, . . . Nth virtual machines 103A-N. In other embodiments, the time period may be provided by an administrator or on install of the underlying host operating system.

After the predetermined period of time has passed, a decision can be made as to whether or not to install an application outside of the respective first, second, . . . Nth virtual machine 103A-N and in the host operating system. The decision may be made in some embodiments by the user. In these embodiments, first, second, . . . Mth computing device 102A-M may display a summary of the monitored information for review by the user. The user can review the summary of the monitored information and make a decision about installing the application in the host operating system. The summary may include a level of confidence that the application includes malware or is free of malware and a recommendation as to whether and how much more time is required for the level of confidence to reach a specified or predetermined level.

In other embodiments, the decision of whether to install an application in the host operating system is made automatically. In these embodiments, there may be established criteria that, if met by an application, automatically prevent the application from being installed in the host operating system. The criteria can be any suitable criteria to detect malware instances, such as those set forth above. In other examples, if an application issues more than a predetermined number of requests that require access to data, memory, or applications that are beyond the capabilities of the respective first, second, . . . Nth virtual machine 103A-N in which it is executing, first, second, . . . Mth computing device 102A-M may be configured to prevent the application from being installed in the host operating system because the actions could be considered a security risk. In other embodiments, first, second, . . . Mth computing device 102A-M may be configured so that, if some predetermined criteria are met, instead of automatically preventing the application from being installed in the host operating system, a user may be prompted to decide whether to authorize the installation of the application in the host operating system. In these embodiments, the user is notified that the predetermined criteria has been met, resulting in a potential security risk, and approval is required before the application can be installed in the host operating system. In other embodiments, the user is warned or the application is quarantined in a virtual machine when the application is deemed to have at least a predetermined level of confidence of an instance of malware.

It is noted that the description above is merely provided to describe some embodiments. In other embodiments, first, second, . . . Mth computing device 102A-M may operate in different systems and be connected to different networks that allow communication with devices shown in system 100 and additional devices. The networks, including network 104 and 116, can be any type of network familiar to those skilled in the art that can support data communications using any of a variety of commercially-available protocols, including, without limitation, TCP/IP, SNA, IPX, AppleTalk, and the like. Merely by way of example, the networks may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol known in the art, and/or any other wireless protocol); and/or any combination of these and/or other networks.

In embodiments, system 100 may also include additional server computers. The servers may be web servers, which may be used to process requests for web pages or other electronic documents from first, second, . . . Mth computing devices 102A-M. The web server can be running an operating system including any of those discussed above, as well as any commercially-available server operating systems. The web server can also run a variety of server applications, including HTTP servers, FTP servers, CGI servers, database servers, Java servers, and the like. In some instances, the web server may publish operations available operations as one or more web services.

The system 100 may also include in embodiments one or more file and/or application servers (not shown), in addition to application server 106. The file and/or application servers, in addition to an operating system, include one or more applications accessible by a client running on one or more of the first, second, . . . Mth computing devices 102A-M. The server(s) may be one or more general purpose computers capable of executing applications or scripts in response to the first, second, . . . Mth computing devices 102A-M. As one example, the server may execute one or more web applications. The one or more web applications may be implemented as one or more scripts or applications written in any application programming language, such as Java™, C, C#™ or C++, and/or any scripting language, such as Perl, Python, or TCL, as well as combinations of any programming/scripting languages. The application server(s) may also include database servers, including without limitation those commercially available from Oracle, Microsoft, Sybase™, IBM the like, which can process requests from database clients.

The first, second, . . . Mth computing devices 102A-M may be general purpose personal computers (including, merely by way of example, personal computers and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These first, second, . . . Mth computing devices 102A-M may also have any of a variety of applications, including for example, database client and/or server applications, and web browser applications. Alternatively, the first, second, . . . Mth computing devices 102A-M may be any other electronic device, such as a thin-client computer, Internet-enabled mobile telephone, and/or personal digital assistant, capable of communicating via a network (e.g., the networks described above) and/or displaying and navigating web pages or other types of electronic documents.

The system 100 may also include databases, in addition to database 118. The databases may reside in a variety of locations. By way of example, databases may reside on a computer readable medium local to (and/or resident in) one or more of the first, second, . . . Mth computing devices 102A-M. Alternatively, it may be remote from any or all of the first, second, . . . Mth computing devices 102A-M, and in communication with one or more of these. In a particular set of embodiments, the databases may reside in a storage-area network ("SAN") familiar to those skilled in the art. Similarly, any necessary files for performing the functions attributed to the first, second, . . . Mth computing devices 102A-M may be stored locally on the respective computer and/or remotely, as appropriate. In one set of embodiments, the databases may be a relational database, such as Oracle 10i™, that is adapted to store, update, and retrieve data in response to SQL-formatted commands. The databases may be the same or similar to the database used herein.

Figure 2:
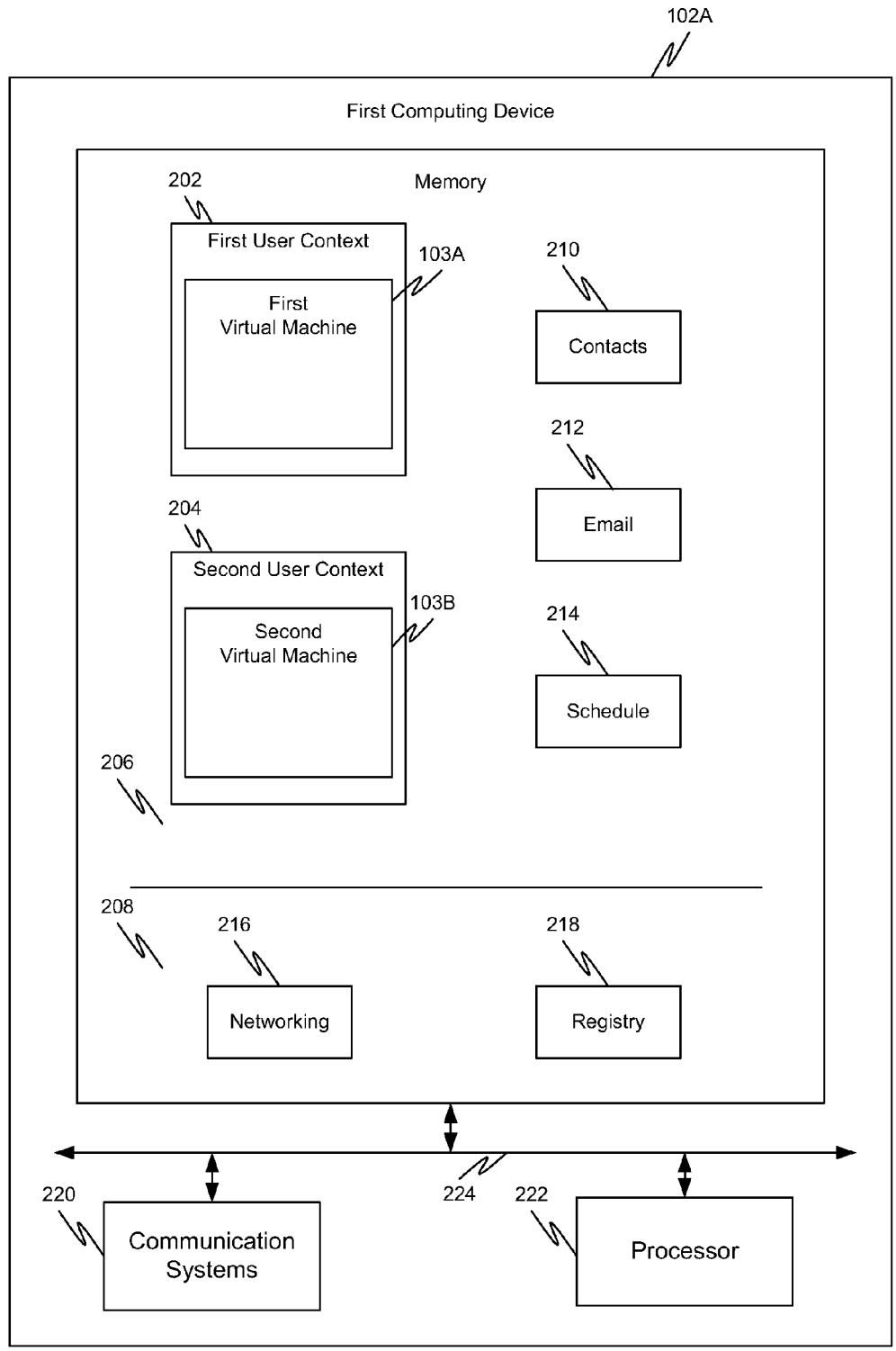
FIG. 2 is a block diagram of an embodiment of a computing device for installing and executing a downloaded content in a virtual machine.

FIG. 2 illustrates another embodiment of a first, second, . . . Mth computing device 102A-M, which includes first and second virtual machines 103A and 103B each of which are associated with a respective first and second user context 202 and 204. As shown in FIG. 2, first virtual machine 103A is associated with first user context 202 and second virtual machine 103B is associated with second user context 204. As noted above, a user context refers to a grouping of objects, modules, routines, sub-routines, and/or applications that are used by a user under situations that have one or more common characteristics such as one or more of time, location, purpose, function, and/or activity. First computing device 102A shown in FIG. 2 also includes some hardware components such as communication system 220 and processor 222 interconnected by a bus 224.

The first and second user contexts 202 and 204 are different or contain or are associated with different objects, modules, routines, sub-routines, and/or applications. One of first and second user contexts 202 and 204 is, in embodiments, a personal context which includes a user's family and friend contacts, personal e-mail, gaming applications, and applications related to a user's hobbies. In other embodiments, one of first and second user contexts 202 and 204 may be a work context which includes work contacts, work e-mail, work schedule, and work applications. These are merely some examples and other embodiments may include contexts for different groups, associations, affiliations, or the like.

In embodiments, the capabilities of each of the first and second virtual machines 103A and 103B reflect security considerations of the user context to which it is associated. That is, the first and second virtual machines 103A-B will have different capabilities resulting in different security configurations. As one example, an employee first or second user context (202 or 204), which includes access to sensitive information including applications (210-214) with work contacts, work email, and work schedule information, in embodiments, will have an associated first or second virtual machine (103A or 103B) that is configured so that it cannot access this sensitive information. On the other hand, a personal user context (202 or 204), which includes applications (210-214) with personal contacts, personal email, and personal schedule information, in embodiments, will have an associated first or second virtual machine (103A or B) that is configured to allow access to the applications (210-214).

In some embodiments, there may be modules or applications that would be considered off limits to any first or second virtual machine (103A or 103B) because of the potential to cause serious harm to the host computer or operating system. For example, first or second virtual machines (103A or B) may be configured so that they cannot access any modules in the kernel memory space 206. Networking modules 216 and registry modules 218 are located in the kernel memory space 208 and therefore would not be accessible to any first or second virtual machine (103A or B), and consequently any application running within the first or second virtual machines (103A or B).

Figure 3:
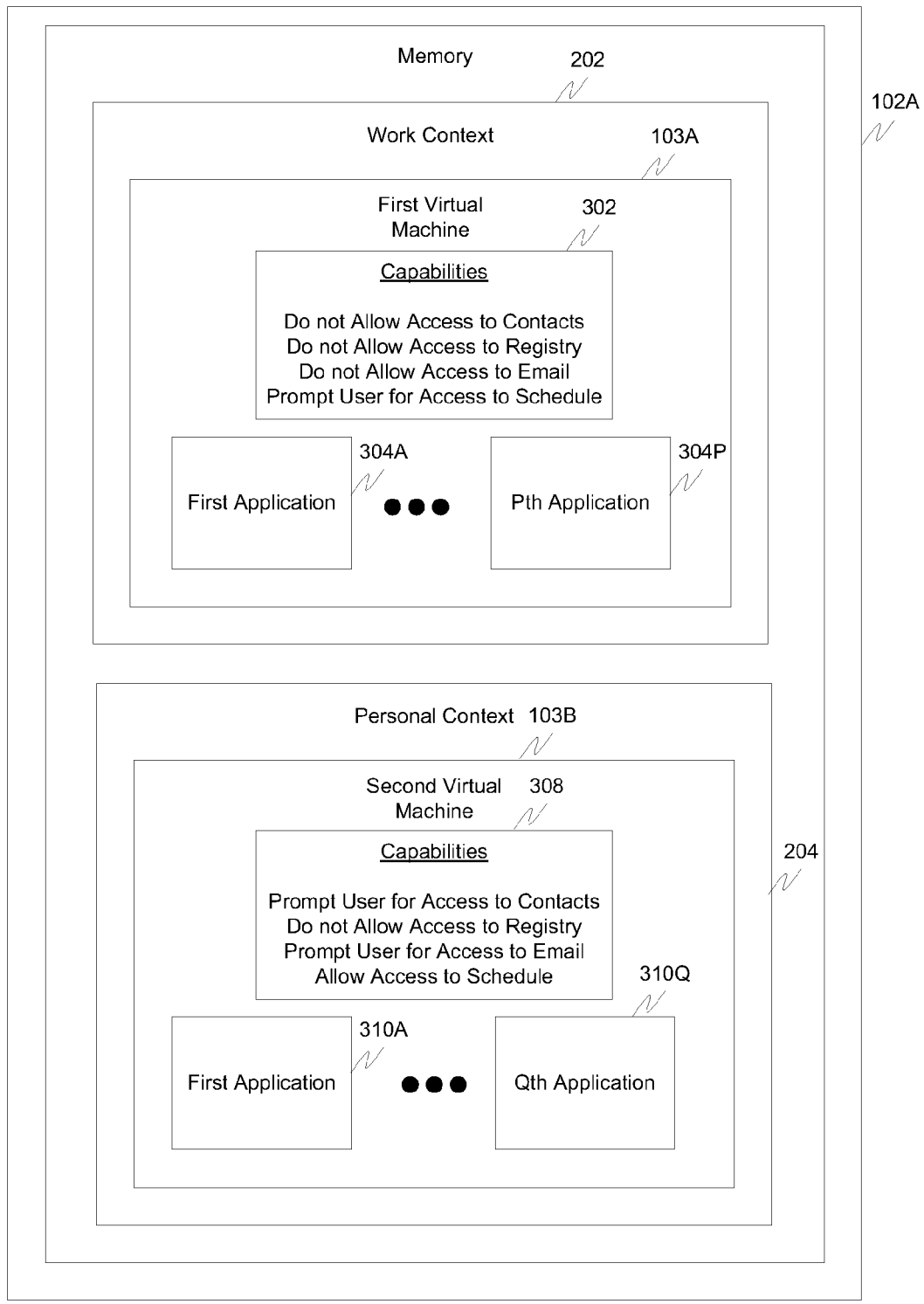
FIG. 3 is a block diagram of an embodiment of a computing device for installing and executing a downloaded content in a virtual machine showing capabilities of the virtual machine.

FIG. 3 illustrates a more detailed example of an embodiment of computing device 102 that includes a specific work context 202 with a virtual machine 103A that has a set of capabilities 302. Computing device 102 also includes a personal context 204 with a virtual machine 103B that has specific capabilities 308.

As shown in FIG. 3, the first virtual machine 103A is configured with a set of capabilities 302 that include: not allowing access to contacts, not allowing access to a registry; not allowing access to an email application; and prompting the user before allowing access to a user's schedule. These capabilities may be selected because the first virtual machine 103A is associated with an work context 202, which allows access to sensitive employer information and therefore has relatively high security requirements. Therefore, any application that will be used in the work context 202 should not be allowed access to this sensitive information and should behave consistent with this additional level of security.

Second virtual machine 103B is configured with a set of capabilities 308 that include: prompting a user for access to contacts, not allowing access to a registry, prompting a user for access to email, and allowing access to a schedule. These capabilities may be selected because second virtual machine 103B is associated with a personal context 204. As can be appreciated, the set of capabilities 308 is less security restrictive than the set of capabilities 302 associated with first virtual machine 103A. Therefore, any application that will be used in the work context 204 may be allowed access to more information because the information may not be considered as sensitive as information related to an employer.

Before any application is installed in the underlying operating system to operate within first and second user context 202 or 204, it will be installed within first or second virtual machine 103A or B to ensure it does not attempt to gain access that goes beyond the capabilities of its respective first and second virtual machine 103A or B. As shown in FIG. 3, first, . . . Pth applications 304A-P and 306A-Q have been installed in first and second virtual machines 103A and B, respectively.

First, . . . Pth applications 304A-P and first, . . . Qth applications 310A-Q are executed and monitored by a respective one of the first and second virtual machines 103A and B. Information about the behavior of the applications will be stored by the respective one of the first, second, . . . Mth computing device 102A-M. The monitored information will then be used to determine whether one or more of the monitored first, . . . Pth applications 304A-P will be allowed to be installed into the underlying operating system of a first, second, . . . Mth computing device 102A-M. Because the first virtual machine 103A has more limited capabilities, first, . . . Pth applications 304A-P will also be limited in their capabilities. The monitored or logged information will include, in embodiments, attempts by a monitored first, . . . Pth application 304A-P to gain access that go beyond the capabilities of the respective one of the first, second, . . . Nth virtual machine 103A-N. In some embodiments, once the number of access requests that go beyond the capabilities of the respective one of the first, second, . . . Nth virtual machine 103A-N reaches a threshold amount, the monitored first, . . . Pth application 304A-P will not be allowed to be installed in the underlying operating system. In other embodiments, the monitored information (including the number of requests for access beyond the capabilities of the respective one of the first, second, . . . Nth virtual machine 103A-N) may be provided to a user that then makes a final decision on whether one or more of the monitored first, . . . Pth applications 304A-P should be installed in the underlying operating system.

Similarly, first, . . . Qth applications 310A-Q are executed and monitored by the second virtual machine 103B. Information about the behavior of the first, . . . Qth applications 310A-Q will be stored by the first computing device 102A. The monitored information will be used to determine whether one or more of the first, . . . Qth applications 310A-Q will be allowed to be installed into the underlying operating system of first computing device 102A. Because the second virtual machine 103B has more capabilities, first, . . . Qth applications 310A-Q will also have more capabilities. The monitored information will include, in embodiments, attempts by one or more of the first, . . . Qth applications 310A-Q to gain access that go beyond the capabilities of the second virtual machine 103B. Because the second virtual machine 103B has more capabilities, the first, . . . Qth applications 310A-Q will also be allowed more capabilities. The first, . . . Qth applications 310A-Q may also attempt access that goes beyond the capabilities of the second virtual machine 103B. These attempts will be monitored and information about them stored on the first computing device 102A. The information may be provided to a user that then makes a final decision on whether one or more of the first, . . . Qth applications 310A-Q should be installed in the underlying operating system.

The above description demonstrates that two or more different virtual machines can be executed on a computing device with different capabilities that allow for different security levels or requirements. Any applications installed in a virtual machine, will be limited to the capabilities of the virtual machine in which it is installed. This allows the flexibility of having a number of virtual machines each with different capabilities and each designed to have different levels of security. An application that will be used in a secure context such as a work context 202 will be required to be initially run in a first virtual machine 103A to determine whether its behavior is consistent with the more secure requirements of the work context 202. Other applications that will be used in the personal second user context 204 will be required to be initially run in the second virtual machine 103B to determine whether its behavior is consistent with the less secure requirements of the personal second user context 204.

In some embodiments, the first and second virtual machines 103A and B will be configured to respond to requests from an application that go beyond the capabilities of the first and second virtual machines 103A and B. In these embodiments, the response to these requests may be partial responses and be designed to make the monitored application(s) determine that the application has successfully requested access to target resources or information. As noted above, the first and second virtual machines 103A and B will not provide access beyond their corresponding capabilities 302 and 308, but they may respond with data that appears to the monitored application that their requested access has been granted. These embodiments allow for the monitored application to continue to execute without errors, which would occur if the monitored application were not allowed their requested access. The respective computing device 102 could then store information indicating that the monitored application requested access beyond the capabilities of respective one of the first and second virtual machine 103A and/or 103B and were provided partial responses.

Figure 4:
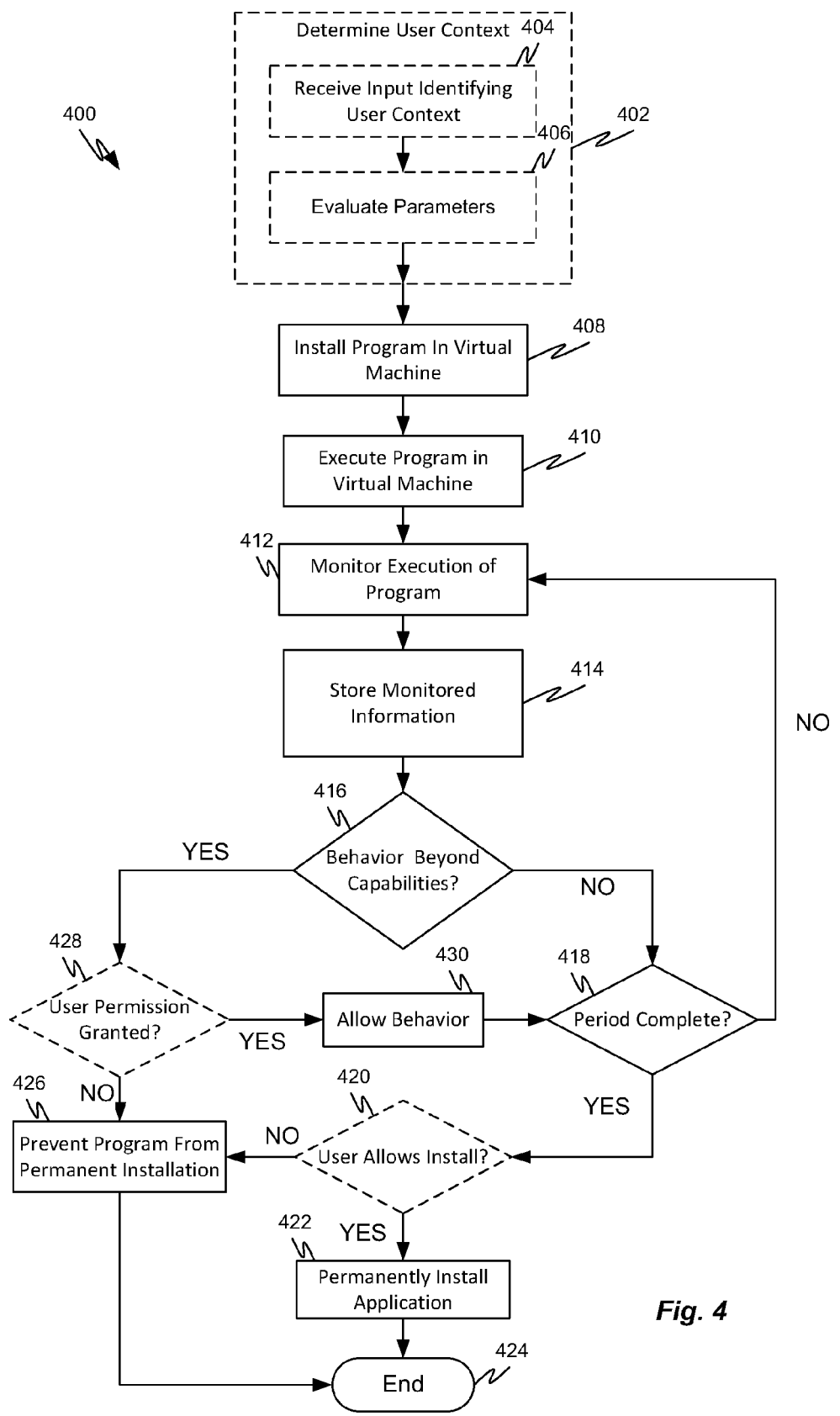
FIG. 4 is a flow diagram of an embodiment of a process for installing and executing a downloaded content in a virtual machine.

Referring now to FIG. 4, a flow diagram 400 in accordance with at least some embodiments of the present disclosure is shown and will be described. Flow 400 is in embodiments performed by a device such as a first, second, . . . Nth computing device 102A-M (FIGS. 1-3). More specifically, one or more hardware or software components may be involved in performing flow 400.

Flow 400 begins with an optional step 402 where a context is determined. The context may be determined in a number of different ways and involve sub-steps. For example, in one embodiment flow 400 involves sub-step 404 where input identifying the user context is received. For example, a device (e.g., a first, second, . . . Nth computing device 102A-M) may prompt the user to identify the user context. In this embodiment, the user context will be determined by user input received in response to the prompt.

In other embodiments, step 402 may involve a sub-step 406 where determining the user context is performed automatically by evaluating some parameters. The parameters may include in embodiments, time, location, and/or activity information of the user. For example, if the current time is a weekday during work hours, the determination may be made that the user is in the work context. If however, the user is on a phone call with a personal friend and not logged into a work network, the determination may be made that the user is in a personal context.

Flow passes from optional step 402 to step 408 where a program is installed in a virtual machine 103. In those embodiments that include optional step 402, the user context determined at step 402 is used to identify a virtual machine 103 associated with the user context. A computing device 102 may include more than one user context and more than one virtual machine 103. The optional step 402 is then performed to identify the user context and associated virtual machine 103 into which the application should be installed and executed. After the user context is determined at step 402, the application will be installed into the virtual machine 103 associated with the determined user context at step 408.

In other embodiments, flow 400 may begin at step 408 where a virtual machine 103 is selected and an application is installed in the virtual machine 103. After step 408, flow passes to step 410 where the application is executed in the virtual machine 103. The application executing in the virtual machine 103 will be limited by the capabilities of the virtual machine 103. For example, if the virtual machine 103 is limited in its ability to access certain data, applications, modules, or other code, the application executing within the virtual machine 103 will also be similarly limited.

After step 410, flow 400 passes to step 412 where information about the application is monitored. In embodiments, there may be a predetermined time period during which the execution of the program is monitored. In some embodiments, the predetermined period is preset by an administrator that set the capabilities of the virtual machine 103. In other embodiments, the period of time is set by a user when the application is initially installed in the virtual machine 103. These are merely some examples and the present disclosure is not limited to any particular way of setting the predetermined period of time.

The monitored information is stored at step 414. The monitored information is used later to decide whether the application running within the virtual machine 103 will be allowed to be installed in the underlying operating system. The monitored information may include information such as application requests (e.g., to store data, retrieve data, send data, and/or launch an application) and performance information (e.g., memory usage, processor usage, and/or bandwidth usage). The monitored information may be stored in any form, such as a file (in markup language, text, and/or other formats) and/or a table in a database. It is noted that in embodiments, steps 412 and 414 occur while step 410 is being performed, i.e., the application is executing within the virtual machine 103. That is, while the application is executing, (step 410) within the virtual machine 103, the information about the application will be monitored and then stored at steps 412 and 414, respectively.

As the application is being monitored at step 412, the application may in some embodiments engage in behavior that goes beyond the capabilities of the virtual machine 103, such as attempt to gain access to secure data or applications. As shown in FIG. 4, a determination is made at decision 416 as to whether a behavior goes beyond the capabilities of the virtual machine 103. If a behavior does not go beyond the capabilities, then flow 400 will pass from decision 416 to decision 418 where another determination is made as to whether the monitoring period has lapsed. If the monitoring period has not lapsed, then flow 400 will loop back to monitoring step 412 where the execution of the application continues to be monitored.

If however at decision 418, a determination is made that the monitoring period has lapsed, flow 400 will pass from decision 418 to optional decision 420. At optional decision 420 a determination is made as to whether the user has allowed the application to be permanently installed in the underlying operating system. Decision 420 may involve a number of steps such as prompting a user to enter a decision on whether or not to permanently install the application. Step 420 is optional because in some embodiments, the decision of whether or not to install the application and the underlying operating system is not left up to user. Rather, the decision is made automatically depending upon the monitoring information as well as any requirements or criteria set by an administrator or user.

If at decision 420 a determination is made that a user has allowed the application to be installed, flow 400 will pass to step 422 where the application will be permanently installed in the underlying operating system. After step 422, flow 400 ends at 424. On the other hand, if at decision 420 a determination is made that the user has not allowed installation of the application, at step 426, the program will not be allowed to be permanently installed and flow 400 will then end at 424.

Referring again to decision 416, if a decision is made that the behavior attempted by the application running in the virtual machine 103 is beyond the capabilities of the virtual machine 103, flow 400 will pass from decision 416 to optional decision 428 where a determination is made as to whether the user has granted permission to the application for the behavior. In some embodiments, even if applications want to behave in a way that goes beyond the capabilities of the virtual machine 103, the user can be prompted to allow the behavior. As one example, if the application is a scheduling application that requires access to a user's schedule, but the virtual machine 103 does not have the capability to access a user's schedule, the user can still be prompted to allow the application to access the user's schedule.

If at decision 428 a determination is made that the user has allowed the behavior, then flow 400 will pass to step 430 where the behavior will be allowed. Flow 400 then passes to decision 418 where a determination will be made as to whether the monitoring period has lapsed. Flow 400 will then pass through decision 418, decision 420, steps 422-426, as described above.

If at decision 428 a determination is made that the user has not allowed the behavior, then flow 400 will pass to step 426 where the application will not be allowed to be permanently installed in the underlying operating system. If the application attempts to engage in behavior that is beyond the capabilities of the virtual machine 103, and a user does not approve the behavior then the natural consequence would be for the application not to be allowed to be permanently installed. However, in some embodiments, even if a user does not allow the behavior, flow 400 may be looped back to monitoring step 412. In these embodiments, the fact that the application attempted to engage in behavior that went beyond the capabilities of the virtual machine 103, and was also not allowed by the user, may merely be recorded as monitored information and the application is allowed to continue to execute. A user can then still make a decision the end of the monitoring period as to whether or not the application should be permanently installed in the underlying operating system. Flow 400 then ends at 424.

The following description of flow 400 is made for illustrative purposes only. It is noted that in embodiments, flow 400 may include additional steps not shown in FIG. 4. Also, in some embodiments, the steps of flow 400 may be performed in different order, in parallel, and/or substantially simultaneously. The present disclosure is not limited to the specific description above of flow 400 and its steps.

Figure 5:
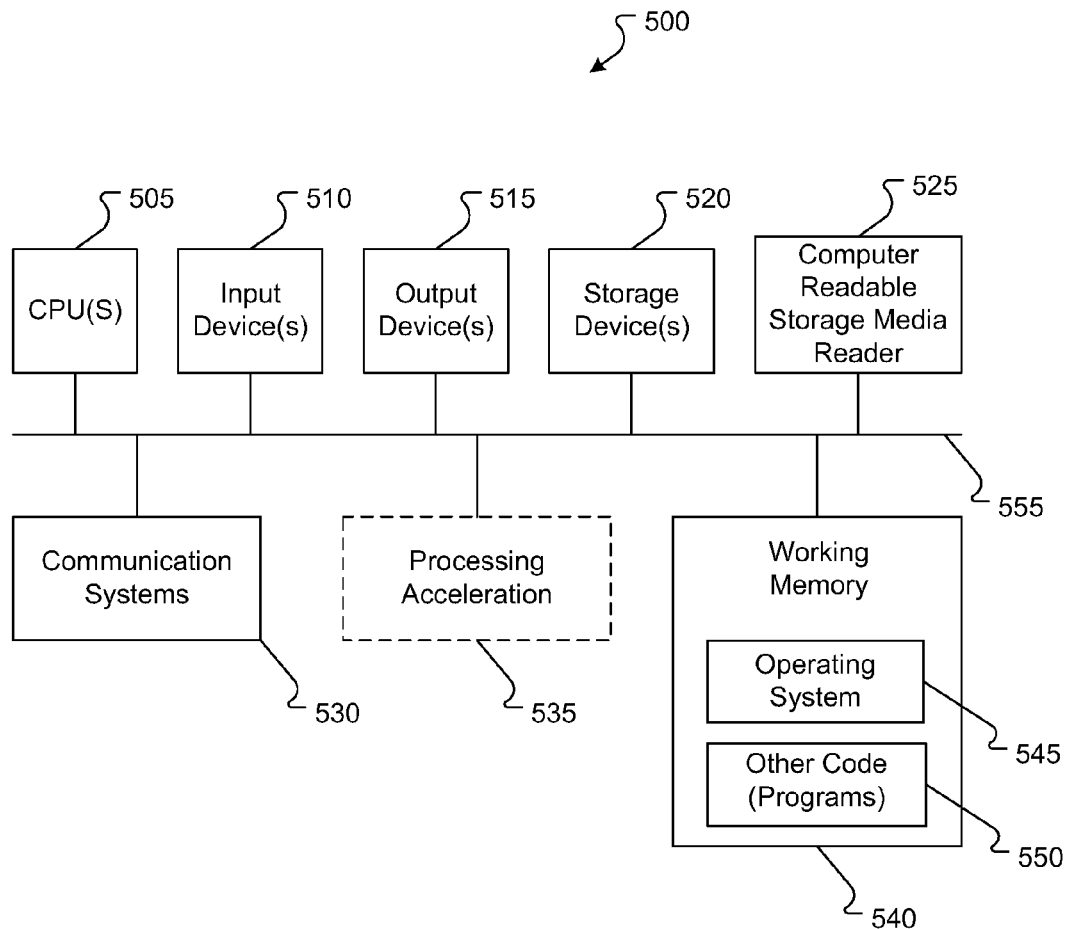
FIG. 5 is a block diagram of an embodiment of a computer or computing system environment operable to execute as the one or more devices described herein.

FIG. 5 illustrates one embodiment of a computer system 500 upon which servers or other systems described herein may be deployed or executed. The computer system 500 is shown comprising hardware elements that may be electrically coupled via a bus 555. The hardware elements may include one or more central processing units (CPUs) 505; one or more input devices 510 (e.g., a mouse, a keyboard, etc.); and one or more output devices 515 (e.g., a display device, a printer, etc.). The computer system 500 may also include one or more storage device(s) 520. By way of example, storage device(s) 520 may be disk drives, optical storage devices, solid-state storage device such as a random access memory ("RAM") and/or a read-only memory ("ROM"), which can be programmable, flash-updateable and/or the like.

The computer system 500 may additionally include a computer-readable media reader 525; a communications system 530 (e.g., a modem, a network card (wireless or wired), an infra-red communication device, etc.); and working memory 540, which may include RAM and ROM devices as described above. In some embodiments, the computer system 500 may also include a processing acceleration unit 535, which can include a DSP, a special-purpose processor and/or the like.

The computer-readable storage media reader 525 can further be connected to a computer-readable medium, together (and, optionally, in combination with storage device(s) 520) comprehensively representing remote, local, fixed, and/or removable storage devices plus storage media for temporarily and/or more permanently containing computer-readable information. The communications system 530 may permit data to be exchanged with the network and/or any other computer described above with respect to the system 500. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 500 may also comprise software elements, shown as being currently located within a working memory 540, including an operating system 545 and/or other code 550, such as application code implementing the servers or devices described herein. It should be appreciated that alternate embodiments of a computer system 500 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other types of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the application code or code segments to perform the necessary tasks may be stored in a machine readable medium such as storage medium. A processor(s) may perform the necessary tasks. A code segment may represent a procedure, a function, a subprogram, an application, a routine, a subroutine, a module, a software package, a class, or any combination of instructions, data structures, or application statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the invention have been described in detail herein, it is to be understood that the inventive concepts may be otherwise variously embodied and employed, and that the appended claims are intended to be construed to include such variations, except as limited by the prior art.

What is claimed is:

1. A system, comprising:
   a non-transitory computer readable medium operable to store computer executable instructions;
   a processor in communication with the computer readable medium, the processor operable to execute the computer executable instructions to perform operations comprising:
   installing a same downloaded content in a plurality of multi-partition space quarantine partitions for a plurality of virtual machines stored in the computer readable medium of a computing device, wherein a first one of the plurality of multi-partition space quarantine partitions comprises a first set of capabilities that is more restrictive than a second one of the plurality of multi-partition space quarantine partitions;
   executing the downloaded content in the first one of the plurality of multi-partition space quarantine partitions and the second one of the plurality of multi-partition space quarantine partitions;
   monitoring execution of the downloaded content in the first one of the plurality of multi-partition space quarantine partitions and the second one of the plurality of multi-partition space quarantine partitions to generate monitored information; and
   storing the monitored information of the downloaded content in the computer readable medium.

2. The system as defined in claim 1, wherein the first one of the plurality of multi-partition space quarantine partitions and the second one of the plurality of multi-partition space quarantine partitions runs in a first and second virtual machine respectively, wherein the first virtual machine is associated with a first user context, wherein the second virtual machine is associated with a second user context that is a different user context of the same user.

3. The system as defined in claim 2, wherein the system further comprises determining the first user context before the installing.

4. The system as defined in claim 1, wherein the first one of the plurality of multi-partition space quarantine partitions and the second one of the plurality of multi-partition space quarantine partitions runs in a first and second virtual machine respectively, wherein the first virtual machine is associated with a first user context and the second virtual machine is associated with a second user context, wherein of the first and second virtual machines are associated with a different set of boundary conditions, and wherein the system further comprises:
  determining from the stored monitored information whether the downloaded content has requested access beyond the first set of capabilities.

5. The system as defined in claim 4, wherein, in response to determining that the stored monitored information indicates that an application has requested access beyond the first set of capabilities, preventing the downloaded content from being installed in a host operating system.

6. The system as defined in claim 4, wherein in response to determining that the stored monitored information indicates that the downloaded content has requested access beyond the first set of capabilities, prompting a user for approval to install the application in a host operating system.

7. The system as defined in claim 4, wherein the first virtual machine does not allow the downloaded content to access some information.

8. The system as defined in claim 4, wherein the first virtual machine provides limited responses to the downloaded content in response to requests by the downloaded content to access information that requires access beyond the first set of capabilities.

9. The system as defined in claim 1, wherein during execution, in response to a request to access information that requires access beyond the first set of capabilities, displaying an approval prompt to receive input regarding allowance of access to the information that requires access beyond the first set of capabilities.

10. A method for executing an application on a mobile device,
  the method comprising:
  determining a first user context of a user of the mobile device;
  installing downloaded content in a plurality of multi-partition space quarantine partitions for a plurality of virtual machines stored in a computer readable medium of the mobile device, wherein a first one of the plurality of multi-partition space quarantine partitions is associated with the first user context and a second one of the plurality of multi-partition space quarantine partitions is associated with a different user context of the user;
  executing the downloaded content in the first one of the plurality of multi-partition space quarantine partitions and the second one of the plurality of multi-partition space quarantine partitions;
  monitoring execution of the downloaded content in the first one of the plurality of multi-partition space quarantine partitions and the second one of the plurality of multi-partition space quarantine partitions to generate monitored information; and
  storing the monitored information of the downloaded content in a computer readable medium.

11. The method as defined in claim 10, wherein the determining comprises receiving input identifying the first user context.

12. The method as defined in claim 10, wherein the determining comprises evaluating one or more of: a current time, a current location, and a current activity.

13. The method as defined in claim 10, wherein the monitoring occurs for a predetermined period of time.

14. The method as defined in claim 13, further comprising:
  receiving an indication of the predetermined period of time prior to the monitoring step.

15. The method as defined in claim 10, wherein the first one of the plurality of multi-partition space quarantine partitions provides limited responses to the downloaded content in response to requests by the downloaded content to access information that requires access beyond capabilities of the first at least one of a quarantine partition and a multi-partition space.

16. The method as defined in claim 14, wherein the first one of the plurality of multi-partition space quarantine partitions runs in a first virtual machine and comprises a first set of capabilities that is more restrictive than a second set of capabilities of the second one of the plurality of multi-partition space quarantine partitions.

17. A non-transitory computer readable medium including computer executable instructions stored onto the computer readable medium which, when executed by one or more processors of a computer, causes the computer to perform operations comprising:
  determining a first user context;
  installing a downloaded content in a first plurality of multi-partition space quarantine partitions for a first plurality of virtual machines stored in a computer readable medium of the computer, wherein a first one of the plurality of the multi-partition space of quarantine partitions is associated with the first context;
  executing the first downloaded content in the first one of the plurality of the multi-partition space of quarantine partitions;
  monitoring execution of the first downloaded content in the first one of the plurality of the multi-partition space of quarantine partitions;
  storing first monitored information of the first downloaded content in a computer readable medium;
  determining a second user context;
  installing a second downloaded content in a second one of the plurality of multi-partition space quarantine partitions stored in the computer readable medium, wherein the second one of the plurality of multi-partition space quarantine partitions is associated with the second user context, wherein the first one of the plurality of multi-partition space quarantine partitions comprises a first set of capabilities that is more restrictive than a second set of capabilities of the second one of the plurality of multi-partition space quarantine partitions;
  executing the second downloaded content in the second one of the plurality of multi-partition space quarantine partitions;
  monitoring execution of the second downloaded content in the second one of the plurality of multi-partition space quarantine partitions; and storing second monitored information of the second downloaded content in the storage medium.

18. The computer readable medium as defined in claim 17, wherein in response to determining that the first stored monitored information indicates a behavior that would go beyond the capabilities of the first one of the plurality of multi-partition space quarantine partitions, preventing the first downloaded content from being permanently installed.

19. The computer readable medium as defined in claim 17, wherein in response to determining that the first stored monitored information indicates a behavior that requires access beyond the first set of capabilities, displaying an approval prompt to receive input regarding allowance of access to the information that requires access beyond the first set of capabilities.

20. The computer readable medium as defined in claim 17, wherein in response to determining that the second stored monitored information indicates a behavior that requires access beyond the second set of capabilities, displaying an approval prompt to receive input regarding allowance of access to the information that requires access beyond the second set of capabilities.

* * * * *